United States Patent [19]

Krisst et al.

[11] 4,249,511

[45] Feb. 10, 1981

[54] SOLAR GRILLE

[76] Inventors: Raymond J. Krisst, 93 Meadow Brook Rd., West Hartford, Conn. 06107; Frank Krisciokaitis, 20 Woodmere Rd., West Hartford, Conn. 06119

[21] Appl. No.: 932,366

[22] Filed: Aug. 9, 1978

[51] Int. Cl.$^3$ .................................................. F24J 3/02
[52] U.S. Cl. ..................................... 126/424; 126/451
[58] Field of Search ......................... 126/424, 451, 425

[56] References Cited

U.S. PATENT DOCUMENTS 2,770,229  11/1956  Tarcici ................................ 126/451

FOREIGN PATENT DOCUMENTS 17218  11/1956  Fed. Rep. of Germany ............ 126/451

Primary Examiner—Carroll B. Dority, Jr.
Attorney, Agent, or Firm—McCormick, Paulding & Huber

[57] ABSTRACT

A grille pan hangs within the focal region of an angularly adjustable parabolic solar collector and is substantially horizontally disposed in all positions of the collector. An aperture in the collector and a screen mounted on the collector supporting structure are aligned along a line of sight parallel to the collector axis and aid in angularly positioning the collector to efficiently receive and reflect solar radiation.

15 Claims, 3 Drawing Figures

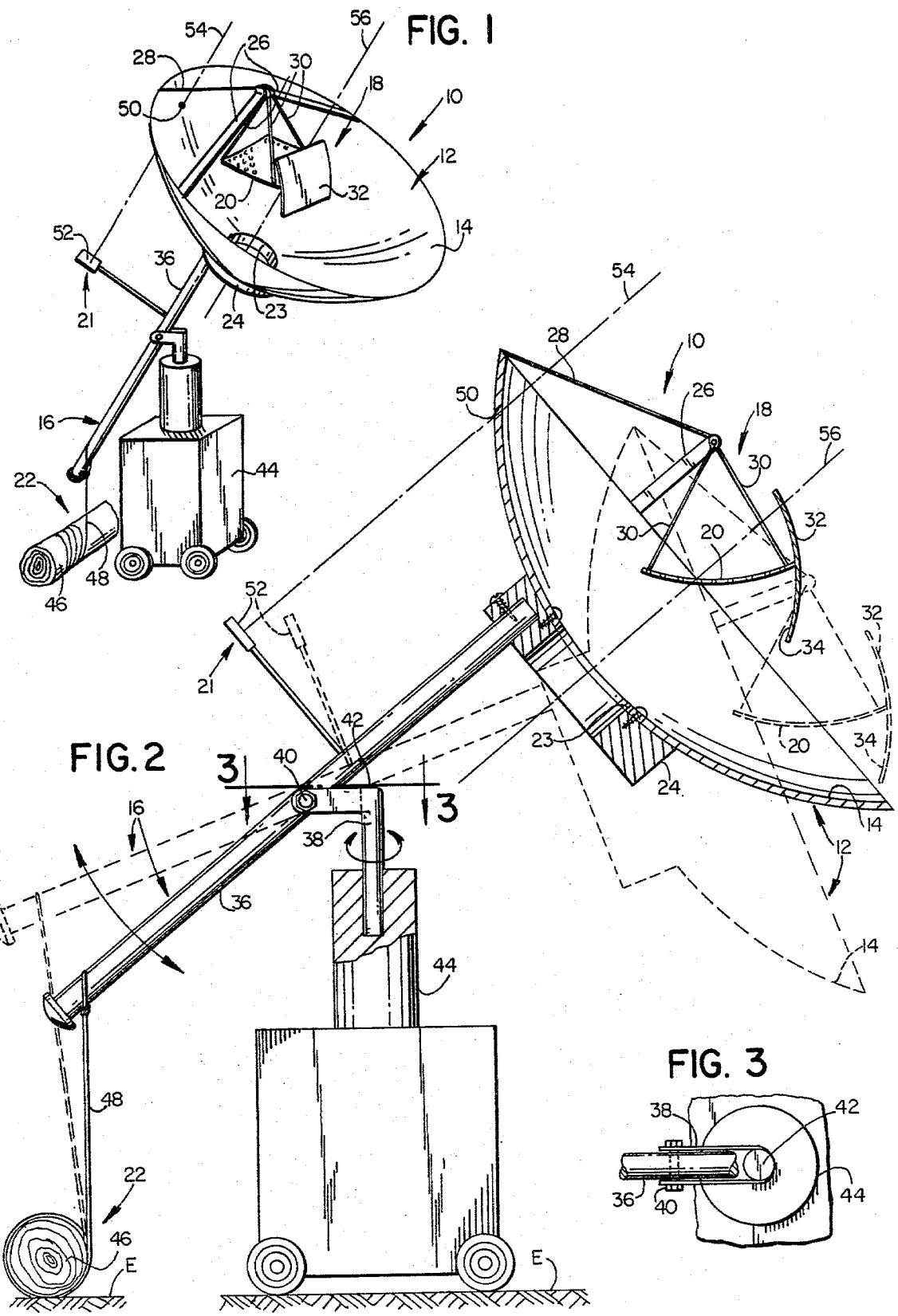

SOLAR GRILLE

BACKGROUND OF THE INVENTION

This invention relates in general to solar cooking apparatus and deals more particularly with an improved solar grille. Such a grille is heated solely by solar radiation and does not consume combustible fuel to produce atmospheric pollutants. The fuel saving economy realized through the efficient utilization of solar energy is self evident. Further, such cooking apparatus is safe to use in locations where conventional grilles using combustible fuels might prove hazardous, as, for example, on a wooden porch or on the balcony of a high-rise apartment building. A further advantage resides in the relatively short heat-up time required before use as compared to grilles using conventional fossil fuels. Accordingly, it is the general aim of the present invention to provide an improved solar grille which offers all of the aforesaid advantages and which may be manufactured and marketed at relatively low cost through the utilization, in part, of readily available materials which require few, if any, manufacturing operations.

SUMMARY OF THE INVENTION

In accordance with the present invention an improved solar grille comprises a solar collector or concentrator which has a parabolic reflecting surface. A simple mechanical structure supports the collector for selected angular positioning relative to the surface of the earth to receive and reflect solar radiation. A grille element is supported by a pendulant support for gravity biasing to a substantially horizontally disposed position within the focal region of the collector in response to selected angular positioning of the collector.

BRIEF DESCRIPTION OF THE DRAWING

FIG. 1 is a perspective view of a solar grille embodying the present invention.

FIG. 2 is a somewhat enlarged side elevational view of the solar grille of FIG. 1 shown partially in vertical section.

FIG. 3 is a fragmentary sectional view taken generally along the line 3—3 of FIG. 2.

DETAILED DESCRIPTION OF PREFERRED EMBODIMENT

Turning now to the drawing, a solar grille embodying the present invention and indicated generally by the reference numeral 10 comprises a collector indicated generally at 12 which has a parabolic reflecting surface 14. The collector 12 is mounted on a supporting structure, designated generally by the numeral 16, which supports it for movement to selected angular positions relative to the surface of the earth, designated by the letter E. A grille assembly indicated generally at 18 includes a generally horizontally disposed grille element 20 which is supported by a pendulant support to be gravity biased to a generally horizontally disposed position within the focal region of the collector 12 in response to movement of the collector to the aforementioned selected angular positions. A sighting device indicated generally at 21 aids in positioning the collector to receive and reflect solar radiation. The solar grille 10 further includes an apparatus indicated generally at 22 for adjusting the collector 12 to and releasably retaining it in selected angular position relative to the earth's surface E, all of which will be hereinafter further described in somewhat more detail.

The collector 12 preferably comprises a thin walled parabolic shell made from metal or other suitable material and has a circular central opening 23 therethrough. The focal length of the parabolic reflecting surface 14 is preferably equal to approximately one-half the radius of the collector shell or bowl as measured at its outer periphery. An annular support disc 24, which is preferably made from wood, is secured by suitable fasteners to the collector 12 generally adjacent its rear surface and in surrounding relation to the hole 23. An outrigger or loop 26 is attached to the upper portion of the collector 12 near the periphery of the collector shell and is stabilized by a cord 28 which is connected between a central portion of the outrigger 26 and the periphery of the collector shell.

The grille element 20 which forms a part of the grille assembly 18 is suspended from the outrigger 26 by support elements 30, 30, which may, for example, be rigid metal straps. The illustrated grille element 20 comprises a perforate concave metal pan which has a radius of curvature approximately equal to the distance from the center of the outrigger 26 to the focal point of the parabolic reflecting surface 14. The bottom surface of the grille pan 20 is preferably black for maximum heat absorption. The support elements 30, 30 are tied or otherwise suitably secured to the outrigger 26 so that the grille pan 20 hangs from the outrigger and may freely pivot to a generally horizontally disposed position under the influence of gravity.

The cooking efficiency of the solar grille 10 is enhanced by a reflector 32 which is mounted on the grille pan 20 and forms a part of the grille assembly 18. The reflector 32 is generally vertically disposed and has a concave reflecting surface 34 which faces in the direction of the grille pan 20 and the parabolic reflecting surface 14.

Considering now the collector supporting structure 16 in further detail, the supporting structure includes an elongated member or rod 36, preferably made of wood, connected at one end to the disc 24, substantially as shown. A generally L-shaped support bracket 38 connected to the rod 36 intermediate its ends by a pivot pin 40 supports the rod for pivotal movement about a horizontal axis. An abutment surface 42 at the upper end of the support bracket cooperates with the rod 36, as it appears in FIG. 2, to limit its angular movement in a clockwise direction. The support bracket is, in turn, mounted on a base 44 for pivotal movement about a vertical axis relative to the base 44.

The adjusting and retaining device 22 includes a cylindrical counterweight or log 46 which is tied by a cord 48 to an end portion of the rod 36 to overbalance the collector 12 and its loaded grille pan 20. The effective length of the cord 48 may be adjusted, as necessary, by winding the cord onto the log 46 to adjust the angular position of the collector 12 relative to the surface of the earth E. The log 46 normally rests on a supporting surface, as shown in FIG. 2, and retains the collector in a selected angular position of adjustment.

The sighting device 21 includes a relatively small aperture 50, formed in the collector shell near its outer peripheral edge, and an alignment piece or screen 52 mounted on the rod 36 in spaced relation to the aperture. The aperture 50 and screen 52 are aligned along a line of sight which is indicated at 54 and generally parallel to the axis of the parabolic surface of the collector, the latter axis being designated by the numeral 56.

An article to be cooked, such as a piece of meat, for example, is placed on the grille pan 20. The collector 12 then pivoted about the vertical axis of the support bracket 38 by moving the log and adjusted to an approximate angular position facing in the direction of the sun by winding the cord 48 onto or paying it off the log 46. The pan 20 will remain in a substantially horizontally disposed position generally within the focal region of the collector 12.

The sighting device 21 is used to accurately position the collector 12 to attain maximum cooking efficiency. When the collector 12 is positioned with its axis 56 properly aimed at the sun, the screen 52 will be shaded by the collector bowl and an image of the sun will be projected upon the screen through the aperture 50.

We claim:

1. A solar grille comprising a collector having a generally parabolic reflecting surface, means supporting said collector for selective angular movement about a horizontal axis to position said collector relative to the surface of the earth to receive and reflect solar radiation, a generally horizontally disposed grille element, and pendulant supporting means mounting said grille element on said collector for maintaining said grille element in a gravity biased horizontally disposed position generally within the focal region of said collector when the collector is positioned in various selected angular positions relative to the surface of the earth.

2. A solar grille as set forth in claim 1 wherein said collector supporting means comprises means supporting said collector for angular movement about a vertical axis.

3. A solar grille as set forth in claim 1 wherein said collector supporting means comprises an elongated member connected at one end to said collector and projecting therefrom and a support bracket connected to said member intermediate the ends of said member and supporting said member for pivotal movement about a horizontal axis.

4. A solar grille as set forth in claim 3 wherein said collector supporting means includes a base and said support bracket is mounted on said base for pivotal movement about a vertical axis.

5. A solar grille as set forth in either claim 3 or claim 4 wherein said collector supporting means includes means for adjusting said collector to and releasably retaining said collector in selected angular position relative to the surface of the earth.

6. A solar grille as set forth in claim 5 wherein said adjusting and retaining means comprises a cord connected at one end to the other end of said elongated member and a counterweight connected to the other end of said cord for overbalancing said collector and adjusting the length of said cord to adjust the angular position of said collector.

7. A solar collector as set forth in claim 6 wherein said counterweight comprises a generally cylindrical member around which said cord may be wound to shorten its effective length.

8. A solar grille as set forth in claim 1 wherein said grille element supporting means comprises an outrigger mounted on said collector above said focal region and means suspending said grille element from said outrigger in hanging relation thereto.

9. A solar grille as set forth in claim 8 wherein said grille element comprises a concave pan.

10. A solar grille as set forth in claim 1 including a reflector mounted in a vertically disposed position on said grille element and having a reflecting surface facing in the direction of said grille element and said parabolic reflecting surface.

11. A solar grille as set forth in claim 1 including sighting means for projecting an image of the sun to facilitate the positioning of said collector to receive and reflect solar radiation.

12. A solar grille as set forth in claim 11 wherein said sighting means comprises an aperture formed in said collector and a screen mounted on said collector supporting means and along a line of sight passing through said aperture and parallel to the axis of said parabolic reflecting surface.

13. A solar grille as set forth in claim 1 wherein the radius of said collector as measured from the axis of said parabolic reflecting surface to the peripheral edge of said collector is equal to approximately twice the focal length of said parabolic reflecting surface.

14. A solar grille comprising a base, a support bracket mounted on said base for pivotal movement about a vertical axis, an elongated support member connected intermediate its ends to said support bracket for pivotal movement about a horizontal axis, a collector mounted at one end of the said elongated member and having a generally parabolic reflecting surface, means for adjusting the collector to and releasably retaining it in selected angular position relative to the surface of the earth and including a cord connected to the other end of said elongated member and a counterweight connected to said cord for overbalancing said collector and adjusting the length of said cord, a generally horizontally disposed concave upwardly opening grille pan, and pendulant supporting means for maintaining said grille pan in a gravity biased horizontally disposed position generally within the focal region of said collector when the collector is positioned in various selected angular positions relative to the earth's surface and including an outrigger mounted on said collector above said focal region and means suspending said grille element from said outrigger in hanging relation thereto and generally within the focal region of said collector, and means for sighting the sun to selectively position said collector to receive and reflect solar radiation and including an aperture formed in said collector and a screen mounted on said collector supporting means and located along a line of sight passing through said aperture and parallel to the axis of said parabolic reflecting surface.

15. A solar grille as set forth in claim 14 including a reflector mounted in vertically disposed position on said grille pan and having an arcuate reflecting surface facing in the direction of said grille pan and said parabolic reflecting surface.

* * * * *